United States Patent
Shinmyo et al.

(10) Patent No.: US 8,565,296 B2
(45) Date of Patent: Oct. 22, 2013

(54) ADAPTIVE RECEIVER SYSTEM AND ADAPTIVE TRANSCEIVER SYSTEM

(71) Applicant: Panasonic Corporation, Osaka (JP)

(72) Inventors: Akinori Shinmyo, Hyogo (JP); Yukio Armina, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/758,657

(22) Filed: Feb. 4, 2013

(65) Prior Publication Data

US 2013/0148704 A1      Jun. 13, 2013

Related U.S. Application Data

(63) Continuation of application No. PCT/JP2011/004065, filed on Jul. 15, 2011.

(30) Foreign Application Priority Data

Aug. 3, 2010   (JP) ................. 2010-174696

(51) Int. Cl.
*H03H 7/30* (2006.01)
(52) U.S. Cl.
USPC ......................................................... 375/232
(58) Field of Classification Search
USPC ................. 375/372, 373, 374, 375, 376
See application file for complete search history.

(56) References Cited

U.S. PATENT DOCUMENTS

| | | |
|---|---|---|
| 2004/0114632 A1 | 6/2004 | Yuuki et al. |
| 2005/0047500 A1* | 3/2005 | Gupta et al. ................. 375/232 |
| 2007/0121767 A1 | 5/2007 | Yamazaki |
| 2007/0280341 A1 | 12/2007 | Hidaka |
| 2007/0280384 A1 | 12/2007 | Hidaka |
| 2007/0280389 A1 | 12/2007 | Hidaka |
| 2007/0280390 A1 | 12/2007 | Hidaka |
| 2007/0280391 A1 | 12/2007 | Hidaka |
| 2007/0297209 A1 | 12/2007 | Hidaka |
| 2007/0297248 A1 | 12/2007 | Hidaka |
| 2007/0300119 A1 | 12/2007 | Hidaka |
| 2008/0056344 A1 | 3/2008 | Hidaka |
| 2008/0247452 A1* | 10/2008 | Lee ................................ 375/232 |
| 2009/0232195 A1 | 9/2009 | Ozawa |
| 2010/0215091 A1* | 8/2010 | Palmer ......................... 375/232 |

FOREIGN PATENT DOCUMENTS

| | | |
|---|---|---|
| EP | 2131523 A1 | 12/2009 |
| JP | 2004-180188 A | 6/2004 |
| JP | 2007-325263 A | 12/2007 |
| JP | 2007-325264 A | 12/2007 |

(Continued)

OTHER PUBLICATIONS

International Search Report issued in International Patent Application No. PCT/JP2011/004065 mailed Aug. 9, 2011.

*Primary Examiner* — Jaison Joseph
(74) *Attorney, Agent, or Firm* — McDermott Will & Emery LLP

(57) ABSTRACT

A phase comparison circuit outputs a first phase comparison signal indicating whether or not an edge of an equalization signal is in a first interval between sampling timing and timing having a first predetermined phase advance, and outputs a second phase comparison signal indicating whether or not the edge of the equalization signal is in a second interval between the sampling timing and timing having a second predetermined phase delay. A determination circuit compares a predetermined comparison target pattern with output patterns of the first and second phase comparison signals corresponding to each bit of a detection data pattern.

19 Claims, 17 Drawing Sheets

(56) References Cited

FOREIGN PATENT DOCUMENTS

| JP | 2007-325265 A | 12/2007 |
|----|---------------|---------|
| JP | 2007-325266 A | 12/2007 |
| JP | 2007-325267 A | 12/2007 |
| JP | 2007-325268 A | 12/2007 |
| JP | 2008-005483 A | 1/2008 |
| JP | 2008-022537 A | 1/2008 |
| JP | 2008-035485 A | 2/2008 |
| JP | 2008-099017 A | 4/2008 |

* cited by examiner

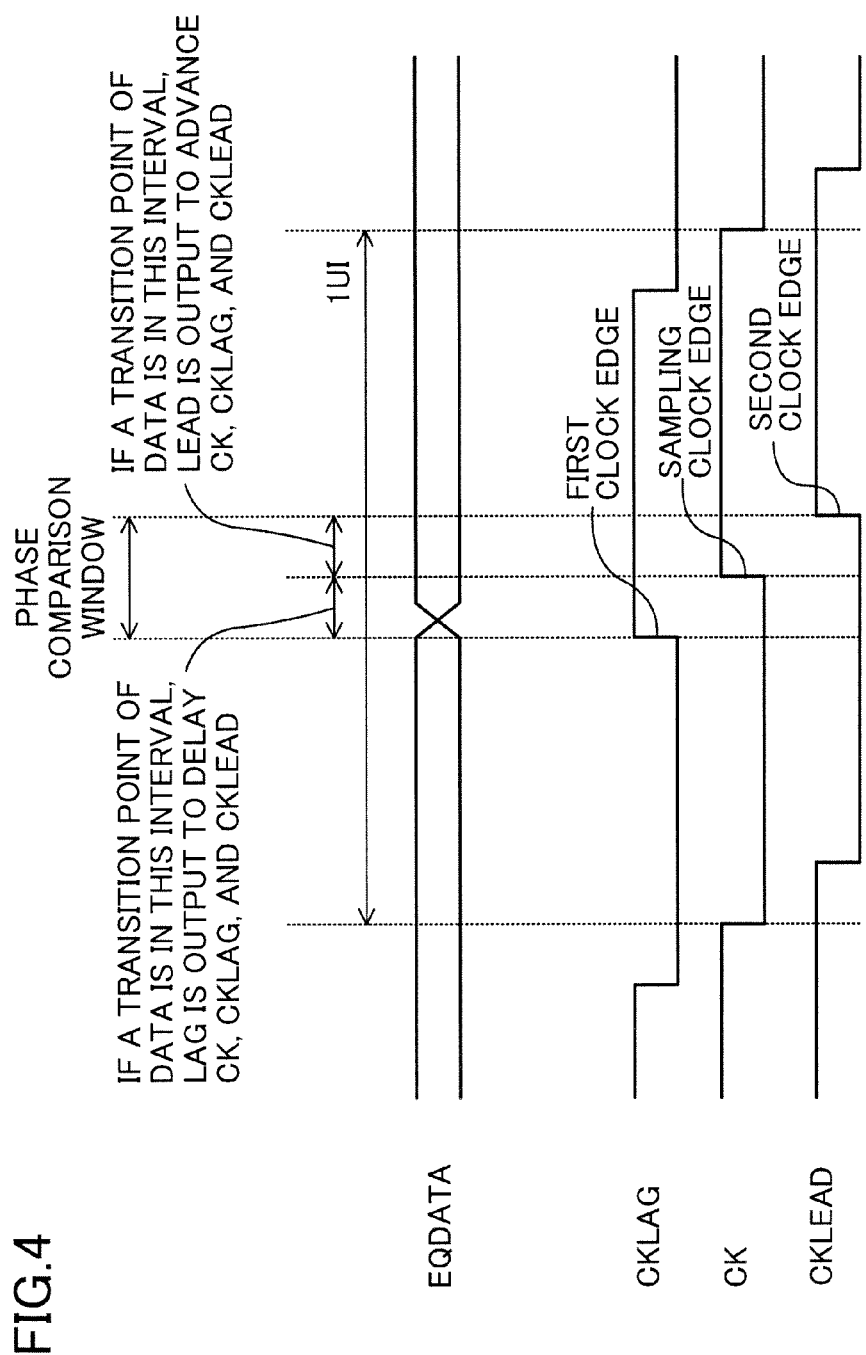

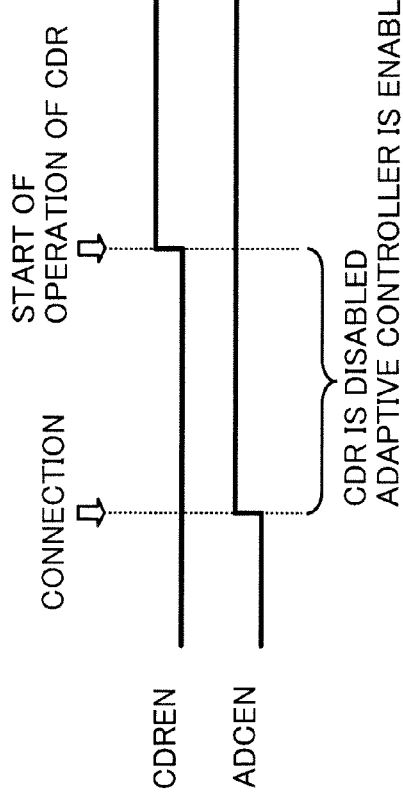
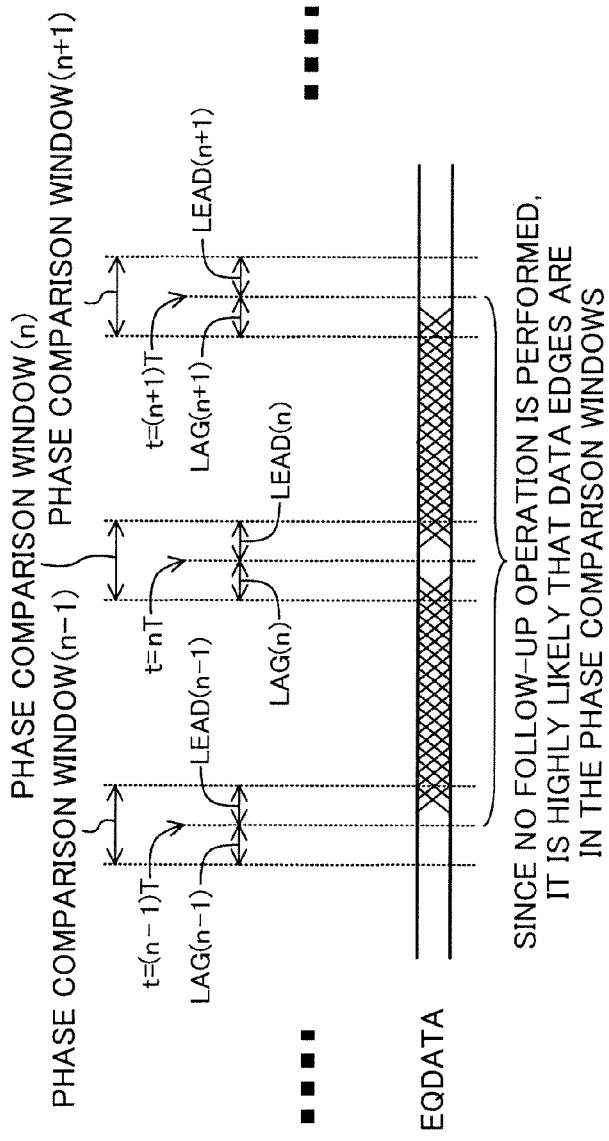
FIG.14A
FIG.14B

ADAPTIVE RECEIVER SYSTEM AND ADAPTIVE TRANSCEIVER SYSTEM

CROSS-REFERENCE TO RELATED APPLICATION

This is a continuation of International Application No. PCT/JP2011/004065 filed on Jul. 15, 2011, which claims priority to Japanese Patent Application No. 2010-174696 filed on Aug. 3, 2010. The entire disclosures of these applications are incorporated by reference herein.

BACKGROUND

The present disclosure relates to an adaptive receiver system configured to receive a reception signal and an adaptive transceiver system including the adaptive receiver system.

Japanese Patent Publication No. 2008-022537 discloses a receiver including an equalizer configured to receive a digital signal from a transmitter to change a frequency response of the digital signal, and a receiver logic configured to adjust a gain of the equalizer. In the receiver, the receiver logic samples output of the equalizer at a certain data point to generate a data value, and samples output of the equalizer at a certain boundary point of data to generate a boundary value. Then, the receiver logic adjusts the gain of the equalizer based on the generated data value and the generated boundary value.

Japanese Patent Publication No. 2008-099017 discloses a clock data recovery device configured to recover a clock signal based on an input digital signal. The clock data recovery device includes an equalizer, a sampler, a clock generator, and an equalizer controller. The equalizer is configured to adjust the level of an input digital signal and output the adjusted digital signal. The sampler is configured to sample a digital signal output from the equalizer by using a clock CKX representing data bit transition timing to obtain a value DX(n) and to sample a digital signal output from the equalizer by using a clock CK representing a central time of each bit duration to obtain a value D(n). The clock generator is configured to adjust, referring to FIG. 2 of Japanese Patent Publication No. 2008-099017, the phases of the clock CKX and the clock CK based on an UP signal (phase comparison signal) representing a significance value when "D(n−1)≠DX(n−1)=D(n)" is satisfied and a DN signal (phase comparison signal) representing the significance value when "D(n−1)=DX(n−1)≠D(n)" is satisfied. The equalizer controller is configured to control, based on the value D(n) and the value DX(n), an offset voltage value added to an input digital signal by the equalizer.

Japanese Patent Publication No. 2004-180188 discloses a clock data recovery circuit configured to compare the phases of input data and a sampling clock to generate a sampling clock based on a comparison result. In the clock data recovery circuit, the phase of the sampling clock is changed such that an edge of the sampling clock and an edge of the input data are apart from each other with more than a predetermined distance.

SUMMARY

However, in Japanese Patent Publication No. 2008-099017, since output of a phase comparison signal continues near a lock point at all times, the following is unstable: adjustment of the phase of the sampling clock near the lock point; and an adaptive control operation of the equalizer. This results in reduction in jitter tolerance. In addition, since the adjustment of the phase of the sampling clock and a control of the offset voltage value added to the input digital signal by the equalizer are performed based on the value D(n) and the value DX(n). Thus, there is a possibility that a false lock occurs due to interference between the adjustment of the phase of the sampling clock and the control of the offset voltage value.

Japanese Patent Publication No. 2008-022537 fails to describe a method for generating a clock used for sampling of output of the equalizer.

In Japanese Patent Publication No. 2004-180188, since no equalizer is provided, an influence of inter-symbol interference (ISI) cannot be reduced. As long as stability of both of the adjustment of the phase of the sampling clock and the adaptive control of the equalizer is not improved, higher speed processing cannot be realized.

The present disclosure has been made in view of the foregoing, and aims to stabilize adjustment of the phase of a sampling clock near a lock point and a control of an equalizer to improve a jitter tolerance.

In order to accomplish the foregoing, an adaptive receiver system for receiving a reception signal according to the present disclosure includes an equalizer circuit configured to equalize the reception signal based on a strength adjustment signal representing an equalization strength and output the reception signal after equalization as an equalization signal; a phase comparison circuit including a first phase comparator to which a sampling clock and a first clock having a first predetermined phase advance with respect to the sampling clock and which outputs a first phase comparison signal indicating whether or not an edge of the equalization signal is in a first interval between sampling timing of the sampling clock and sampling timing of the first clock, and a second phase comparator to which the sampling clock and a second clock having a second predetermined phase delay with respect to the sampling clock and which outputs a second phase comparison signal indicating whether or not the edge of the equalization signal is in a second interval between the sampling timing of the sampling clock and sampling timing of the second clock; a clock adjustment circuit configured to adjust, based on the first and second phase comparison signals, a phase of the sampling clock such that a phase of the equalization signal and the phase of the sampling clock are coincidence with each other and output the sampling clock; a recoverer configured to output a recovery signal obtained by sampling the equalization signal by using the sampling clock; a pattern detection circuit configured to detect a detection data pattern based on the recovery signal; a determination circuit to which an output signal of the pattern detection circuit is input and which is configured to compare, when the detection data pattern is detected, output patterns of the first and second phase comparison signals with a predetermined comparison target pattern and determine a bit duration of the equalization signal based on whether or not the output patterns and the predetermined comparison target pattern are matched to each other; and an adaptive control filter circuit configured to adjust the strength adjustment signal based on a determination result of the determination circuit.

According to the foregoing aspect, the first and second phase comparison signals are generated based on the presence or absence of the edge of the equalization signal in the first and second intervals defined before and after the sampling timing. Thus, values for the first and second phase comparison signals are stabilized in the state in which the phases of the equalization signal and the sampling clock are coincidence with each other, i.e., stabilized near a lock point, and the phase of the sampling clock is not adjusted. Consequently, a tolerance against high-frequency noise is maintained high while a stable adaptive operation of an equalizer is realized. In addition, interference between adjustment of the phase of the sampling clock and a control of the equalization strength can be reduced.

According to the present disclosure, the tolerance against high-frequency noise is maintained high while the stable adaptive operation of the equalizer is realized. In addition, the interference between the adjustment of the phase of the sampling clock and the control of the equalization strength can be reduced.

BRIEF DESCRIPTION OF THE DRAWINGS

FIG. 4 is a timing chart illustrating a phase comparison operation of a clock data recoverer of the first embodiment of the present disclosure.

FIG. 14A is a timing chart waveforms of a clock adjustment enable signal and an adaptive control enable signal right after a connection between the adaptive receiver system and an adaptive transmitter system in the second embodiment of the present disclosure. FIG. 14B is a diagram illustrating a relationship between an edge of an equalization signal and a phase comparison window in the second embodiment of the present disclosure.

DETAILED DESCRIPTION

Figure 1:
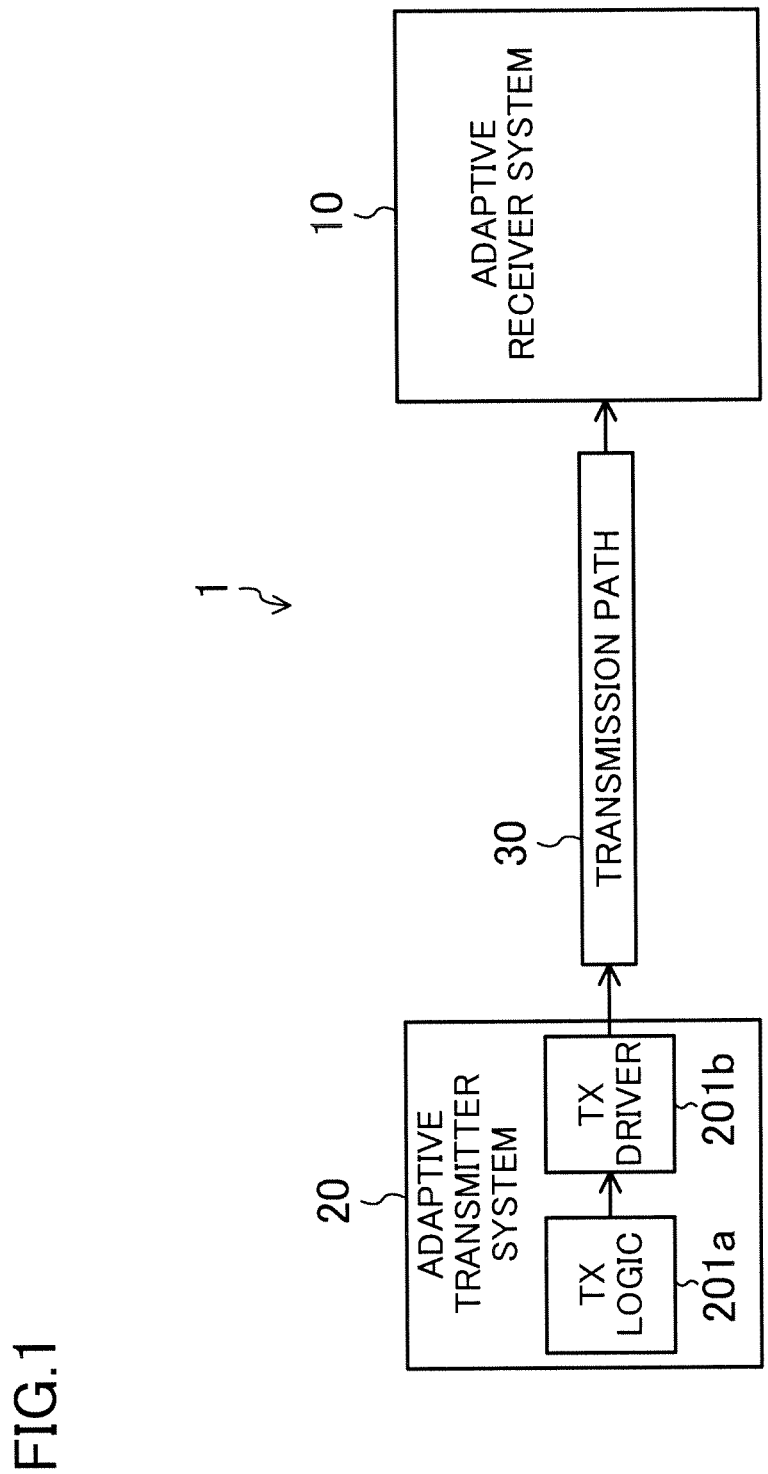
FIG. 1 is a block diagram illustrating a configuration of an adaptive transceiver system of a first embodiment of the present disclosure.

Embodiments of the present disclosure will be described below with reference to drawings. Note that the same reference numerals are used to represent equivalent elements in each of the embodiments below, and description thereof will not be repeated.

<<First Embodiment>>

FIG. 1 illustrates an adaptive transceiver system 1 of a first embodiment of the present disclosure. The adaptive transceiver system 1 includes an adaptive transmitter system 20, a transmission path 30, and an adaptive receiver system 10. The adaptive transmitter system 20 includes a TX logic 201a configured to generate a reception signal RXDATA (logic signal), and a TX driver 201b configured to output a reception signal RXDATA generated by the TX logic 201a to the transmission path 30.

Figure 2:
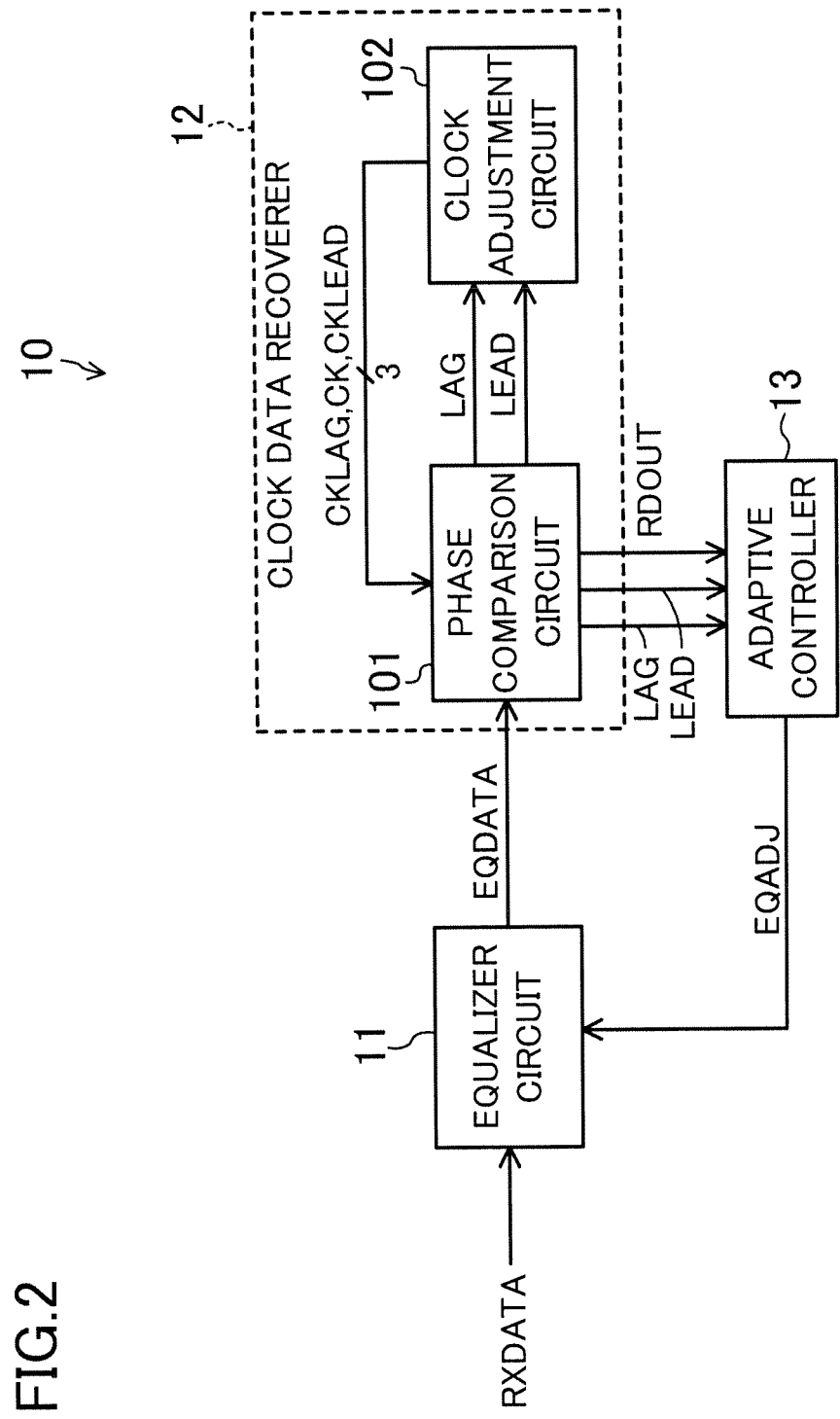
FIG. 2 is a block diagram illustrating a configuration of an adaptive receiver system of the first embodiment of the present disclosure.

FIG. 2 illustrates the adaptive receiver system 10. The adaptive receiver system 10 includes an equalizer circuit 11, a clock data recoverer 12, and an adaptive controller 13. The equalizer circuit 11 is configured to receive a reception signal RXDATA having distortion caused due to passage thereof through the transmission path 30 and perform waveform equalization to output an equalization signal EQDATA. The clock data recoverer 12 is configured to extract a clock from an equalization signal EQDATA output from the equalizer circuit 11 and obtain a recovery signal RDOUT by sampling using the extracted clock.

Figure 3A:
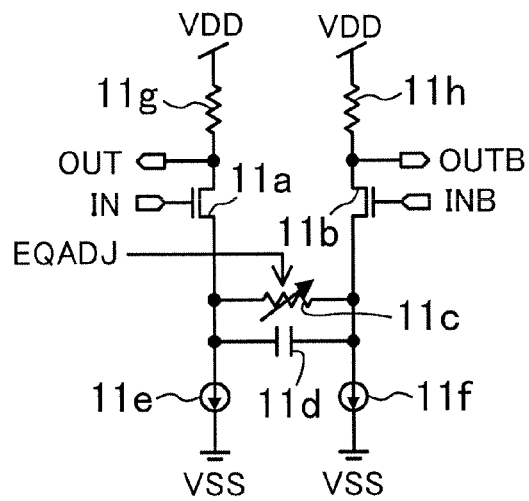
FIG. 3A is a circuit diagram illustrating a configuration of an equalizer circuit of the first embodiment of the present disclosure.

FIG. 3A illustrates the equalizer circuit 11. The equalizer circuit 11 includes a pair of nMOS transistors 11a, 11b, a resistor 11c connected between sources of the nMOS transistors 11a, 11b, a capacitor 11d connected between the sources of the nMOS transistors 11a, 11b, a current source 11e configured to apply current to the nMOS transistor 11a, a current source 11f configured to apply current to the nMOS transistor 11b, a resistor 11g connected in series with a drain of the nMOS transistor 11a, and a resistor 11h connected in series with a drain of the nMOS transistor 11b.

Figure 3B:
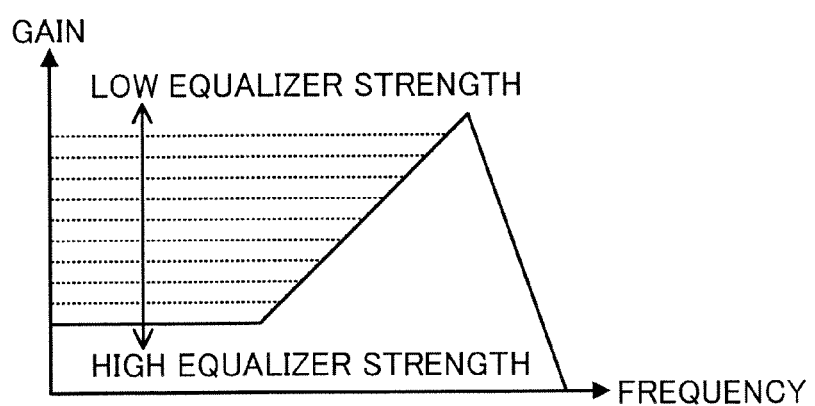
FIG. 3B is a graph illustrating a relationship between the frequency of the equalizer circuit and an equalizer strength (equalization strength) in the first embodiment of the present disclosure.

A resistance value of the resistor 11c is adjusted based on a strength adjustment signal EQADJ. A DC gain can be adjusted by adjusting the resistance value of the resistor 11c based on the strength adjustment signal EQADJ. If the DC gain is decreased by increasing the resistance value of the resistor 11c, a high-frequency gain is increased relative to the DC gain. On the other hand, if the DC gain is increased by decreasing the resistance value of the resistor 11c, the high-frequency gain is decreased relative to the DC gain. Thus, an equalization strength can be adjusted by adjusting the resistance value of the resistor 11c based on the strength adjustment signal EQADJ. FIG. 3B illustrates a relationship between a frequency and an equalizer strength (equalization strength). The strength adjustment signal EQADJ may be a continuous signal or a discrete signal. Note that an equalizer having other configuration may be used as the equalizer circuit 11. For example, the following may be used as the equalizer circuit 11: a multistage circuit formed by connecting a plurality of equalizer circuits 11 illustrated in FIG. 3(a); or a discrete equalizer such as a feed-forward equalizer (FFE) or a decision feedback equalizer (DFE).

The clock data recoverer 12 includes a phase comparison circuit 101 and a clock adjustment circuit 102.

The phase comparison circuit 101 is configured to compare phases at an edge of an equalization signal EQDATA and an edge of a sampling clock CK and output a first phase comparison signal LAG and a second phase comparison signal LEAD.

The clock adjustment circuit 102 is configured to adjust, based on the first phase comparison signal LAG and the second phase comparison signal LEAD, the phase of the sampling clock CK and the phases of a first clock CKLAG and a second clock CKLEAD together defining a phase comparison window and to output such clocks. The phase adjustment is performed such that the phases of the equalization signal EQDATA and the sampling clock CK are coincidence with each other.

FIG. 4 illustrates an phase comparison operation of the clock data recoverer 12. The phase comparison circuit 101 of the clock data recoverer 12 activates a phase comparison signal in the case where an edge of an equalization signal EQDATA is in a phase comparison window defined by a first clock CKLAG and a second clock CKLEAD. Specifically, in the case where the edge of the equalization signal EQDATA is in a first interval defined by the first clock CKLAG and a sampling clock CK, i.e., between a rising edge of the first clock CKLAG and a rising edge of the sampling clock CK, the phase comparison circuit 101 activates a first phase comparison signal LAG to delay each of the phases of the first clock CKLAG, the sampling clock CK, and the second clock CKLEAD. In the case where the edge of the equalization signal EQDATA is in a second interval defined by the sampling clock CK and the second clock CKLEAD, i.e., between the rising edge of the sampling clock CK and a rising edge of the second clock CKLEAD, the phase comparison circuit 101 activates a second phase comparison signal LEAD to advance each of the phases of the first clock CKLAG, the sampling clock CK, and the second clock CKLEAD. The first and second intervals are set such that the edge of the equalization signal EQDATA is not positioned therein with the phases of the equalization signal EQDATA and the sampling clock CK being coincidence with each other. For example, the first and second intervals are set to equal to or less than ⅓ of a cycle, i.e., 1 UI, of the sampling clock CK.

In addition, the phase comparison circuit 101 of the clock data recoverer 12 samples the equalization signal EQDATA by using the sampling clock CK to obtain a recovery signal RDOUT.

The adaptive controller 13 is configured to receive the recovery signal RDOUT obtained by the phase comparison circuit 101, the first phase comparison signal LAG, and the second phase comparison signal LEAD to determine an equalization state of the equalizer circuit 11. The adaptive controller 13 determines whether or not each of the first phase comparison signal LAG and the second phase comparison signal LEAD is activated in phase comparison intervals right after and right before a rising edge of the sampling clock CK corresponding to each of at least three consecutive bits of the recovery signal RDOUT. Then, a duration for one bit is estimated by comparing the determination result with a predetermined output pattern. If the estimated duration for one bit is longer than 1 UI, the adaptive controller 13 adjusts a strength adjustment signal EQADJ such that the equalization strength is decreased. On the other hand, if the estimated duration for one bit is shorter than 1 UI, the adaptive controller 13 adjusts the strength adjustment signal EQADJ such that the equalization strength is increased. Even in the case where the phase comparison window is limited in a predetermined range and there is an interval(s) in which no phase comparison is performed, the duration for one bit can be estimated for each of at least three consecutive bits of the recovery signal RDOUT with reference to the recovery signal RDOUT, the first phase comparison signal LAG, and the second phase comparison signal LEAD. In addition, since the phase comparison window is limited, edges of the equalization signal EQDATA are concentrated outside the phase comparison window upon phase locking, and therefore the phase comparison signals are not activated. Thus, ISI can be removed with an optimum equalization strength, and stability at a lock point can be ensured. In addition, a tolerance against high-frequency noise can be improved.

Figure 5:
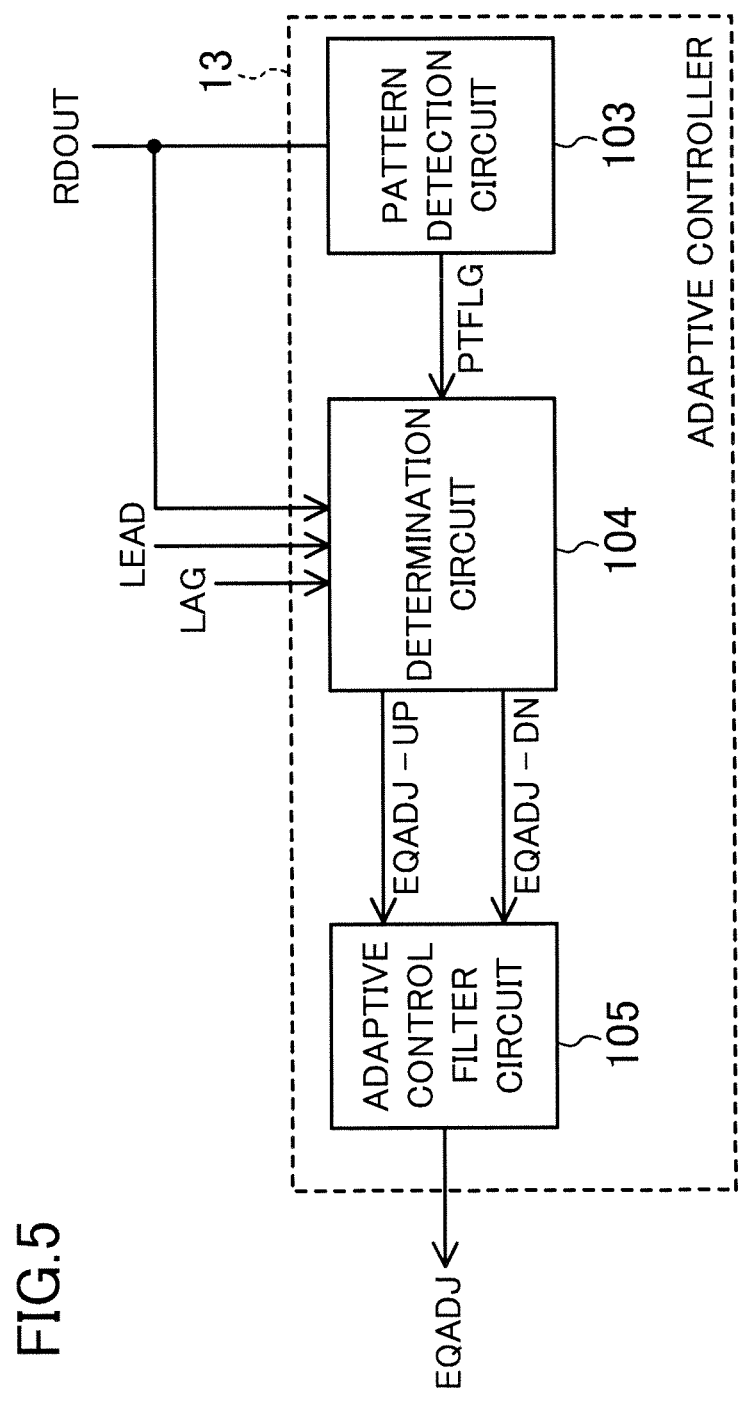
FIG. 5 is a block diagram illustrating a configuration of an adaptive controller of the first embodiment of the present disclosure.

A configuration and an operation of the adaptive controller 13 will be described in detail. Referring to FIG. 5, the adaptive controller 13 includes a pattern detection circuit 103, a determination circuit 104, and an adaptive control filter circuit 105.

Figure 6:
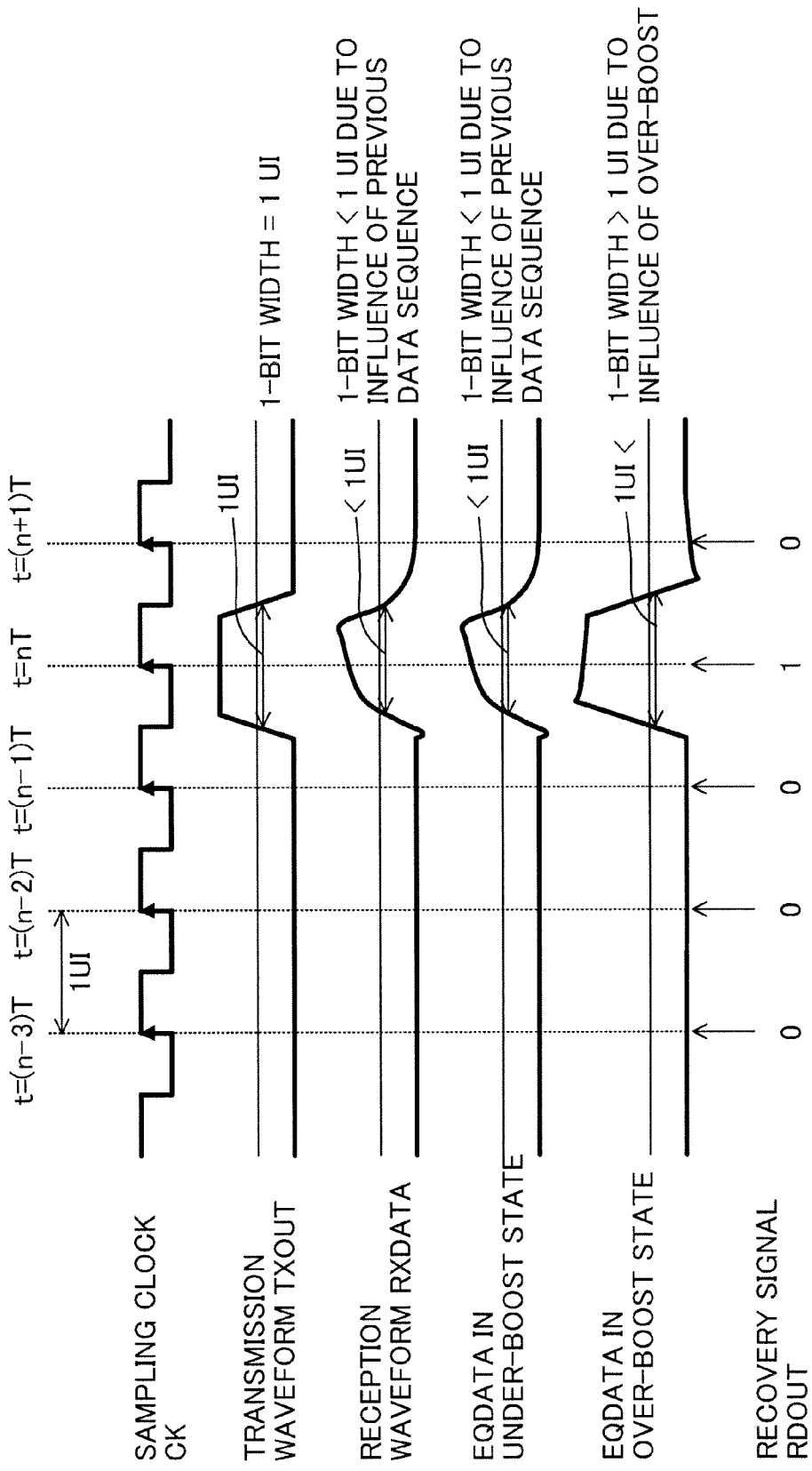
FIG. 6 is a timing chart illustrating an equalization signal, a recovery signal, etc. in the case where there is a lone bit having a duration of 1 unit interval (UI) in a transmission waveform of the first embodiment of the present disclosure.

The pattern detection circuit 103 is configured to output an activated detection flag signal PTFRG in the case where a predetermined detection data pattern is detected from a recovery signal RDOUT. The detection data pattern is a pattern in which k consecutive bits of "0" are followed by "010," or a pattern in which k consecutive bits of "1" are followed by "101." Note that "k" is an integer of 0 or more. The magnitude of distortion caused due to the ISI greatly depends on a pattern to be detected. Referring to FIG. 6, in the case where a plurality of consecutive identical data bits are followed by an inverted data bit and then a further-inverted data bit comes thereafter, e.g., the case where the data pattern is "00010" or "11101," a great influence of the ISI is caused.

In the case where data output from a transmitter and having a transmission waveform TXOUT has a lone bit having a duration of 1 UI, signal RXDATA received by a receiver is, referring to, e.g., FIG. 6, attenuated due to passage thereof through the transmission path 30, and therefore a lone bit duration of the signal RXDATA is shorter than 1 UI. Although the equalizer circuit 11 equalizes a waveform of the data RXDATA having distortion caused due to the ISI such that the waveform of the data RXDATA approximates the transmission waveform TXOUT as close as possible, the lone bit duration remains shorter than 1 UI in a under-boost state in which the equalization strength is low. On the other hand, in an over-boost state in which the equalization strength is high, since a data bit is inverted after enhancement of a data edge corresponding to the lone bit and before amplitude stabilization, the lone bit duration is longer than 1 UI. As described above, in the case where a plurality of consecutive identical data bits are followed by an inverted data bit and then a further-inverted data bit comes thereafter, it can be, by detecting the lone bit duration, determined whether a current equalization state is the under-boost state or the over-boost state. Thus, if the following is detected, the pattern detection circuit 103 outputs an activated detection flag signal PTFRG to the determination circuit 104: a recovery signal RDOUT sampled at a time of $t=(n-1)T$ (where "n" is an integer of 1 or more) and a recovery signal RDOUT sampled at a time of $t=nT$ are different from each other; the recovery signal RDOUT sampled at a time of $t=nT$ and a recovery signal RDOUT sampled at a time of t=(n+1)T are different from each other; and the recovery signal RDOUT sampled at a time of t=(n−1)T is identical to a recovery signal RDOUT obtained based on consecutive k samples prior to a time of t=(n−1)T (i.e., the recovery signal RDOUT sampled at a time of t=(n−1)T is a low-frequency signal).

The determination circuit 104 is configured to determine, based on the recovery signal RDOUT, the first phase comparison signal LAG, and the second phase comparison signal LEAD, whether the lone bit duration is longer or shorter than 1 UI, and to output, if the lone bit duration is longer than 1 UI, an activated first adjustment signal EQADJ-DN to decrease the equalization strength of the equalizer circuit 11. On the other hand, if the lone bit duration is shorter than 1 UI, the determination circuit 104 is configured to output an activated second adjustment signal EQADJ-UP to increase the equalization strength of the equalizer circuit 11. In the present embodiment, the phase comparison window is limited within a predetermined range, and a clock for determining a boundary point between data bits is not used. Thus, the lone bit duration cannot be estimated with reference to sampling data at the boundary point. However, the long bit duration can be estimated by analyzing a recovery signal RDOUT having at least three consecutive bits including a lone bit (positioned between two inverted bits) and analyzing an activation state of a first phase comparison signal LAG and a second phase comparison signal LEAD which are compared with the recovery signal RDOUT in phase comparison windows right before and right after an edge of a sampling clock CK corresponding to each bit of the recovery signal RDOUT.

Figure 7:
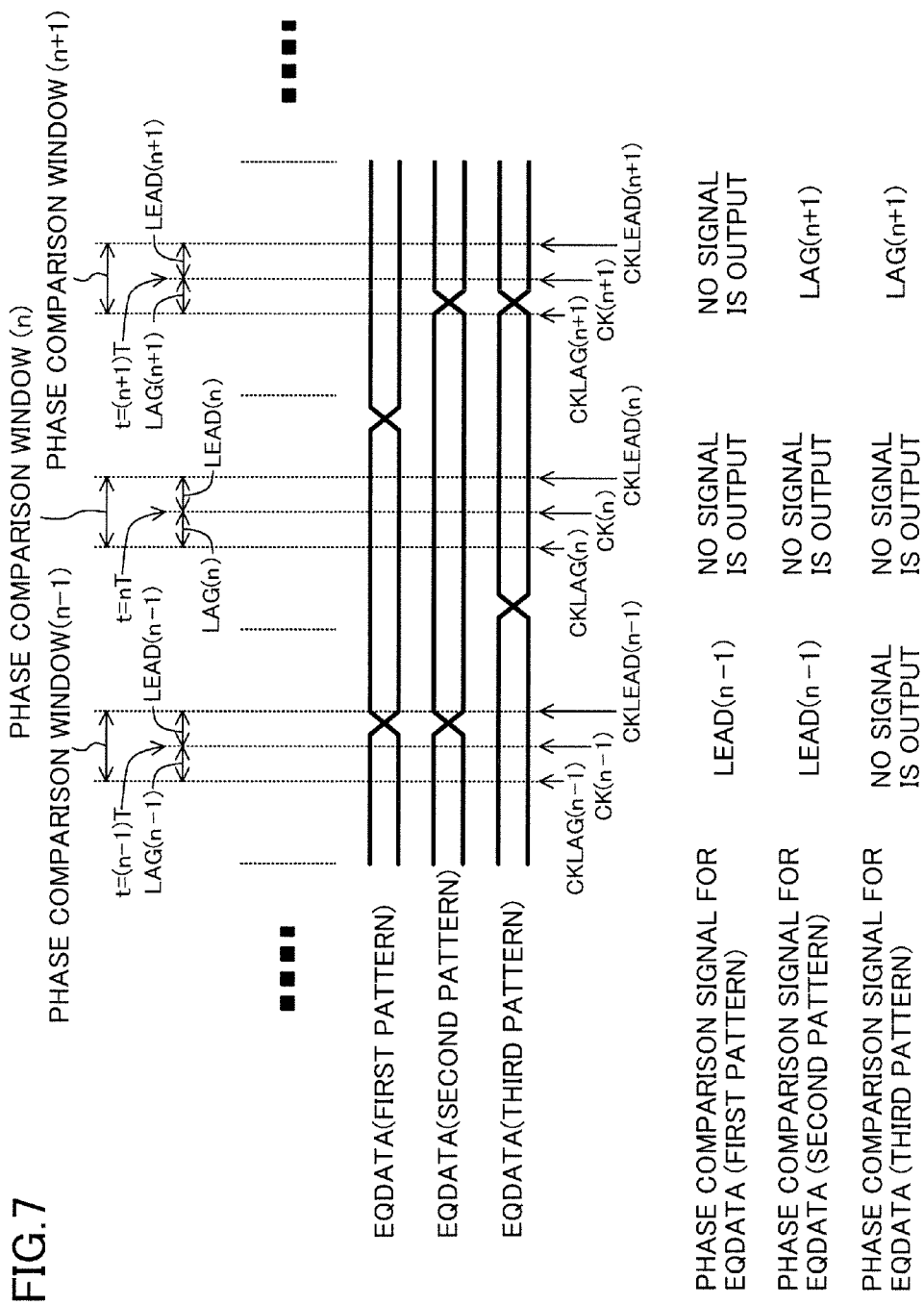
FIG. 7 is a diagram illustrating an algorithm for determining a lone bit duration in the first embodiment of the present disclosure.
Figure 8:
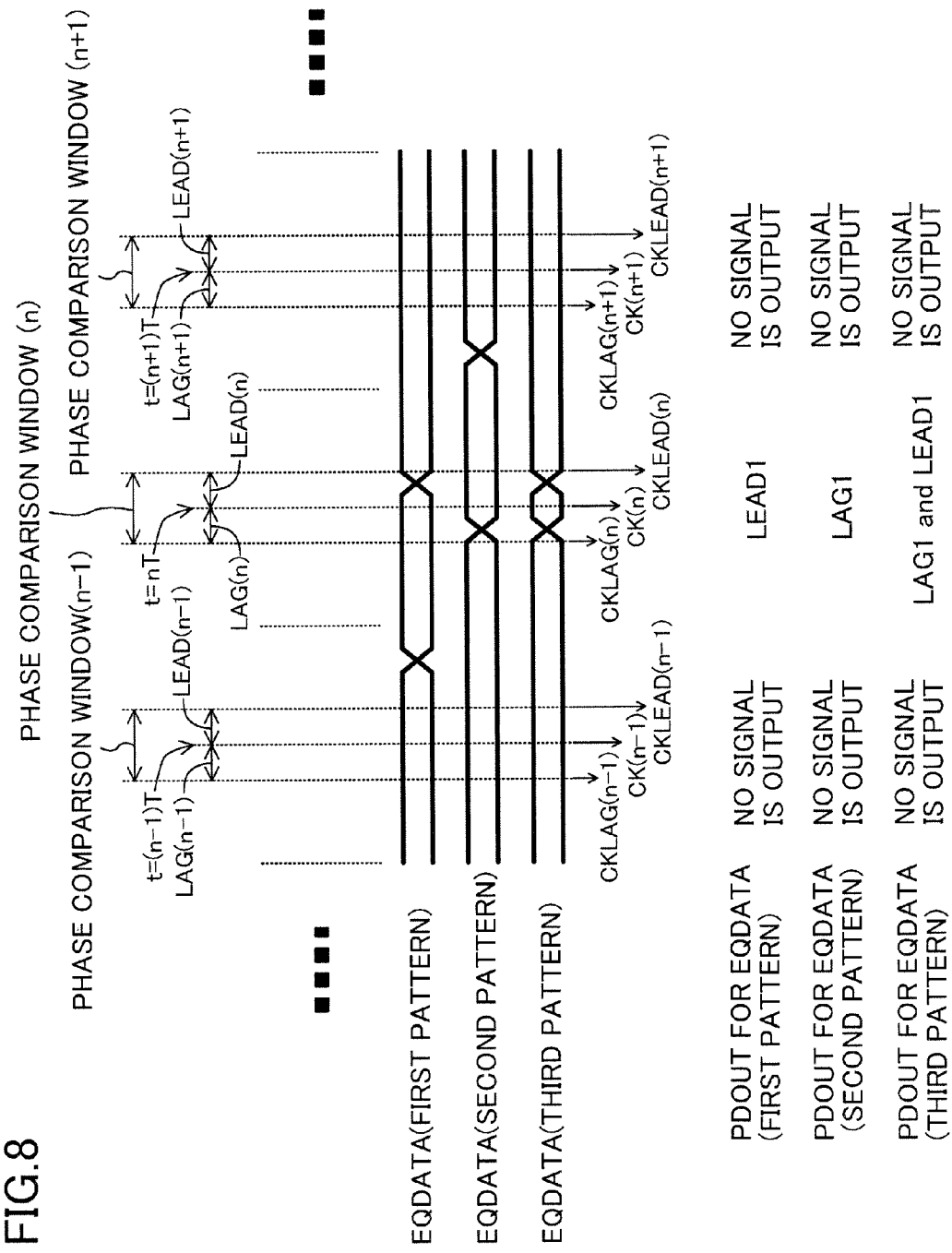
FIG. 8 is a diagram illustrating an algorithm for determining a lone bit duration in the first embodiment of the present disclosure.

FIGS. 7 and 8 illustrate algorithms for determining the lone bit duration. FIG. 7 illustrates the algorithm for determining whether or not the lone bit duration is equal to or longer than 1 UI, and FIG. 8 illustrates the algorithm for determining whether or not the lone bit duration is equal to or shorter than 1 UI.

In FIGS. 7 and 8, a phase comparison window (n−1), a phase comparison window (n), and a phase comparison window (n+1) are three consecutive phase comparison windows, and "LAG(n−1)," "LEAD(n−1)," "LAG(n)," "LEAD(n)," "LAG(n+1)," and "LEAD (n+1)" each represent a first or second phase comparison signal to be activated when an edge of an equalization signal EQDATA is in a corresponding one of the phase comparison windows. If data sampled by using CK(n−1) and data sampled by using CK(n) are different from each other, and data sampled by using CK(n) and data sampled by using CK(n+1) are different from each other, i.e., if a data pattern has a data sequence of "010" or "101," the lone bit duration can be determined.

If EQDATA (first pattern), EQDATA (second pattern), and EQDATA (third pattern) illustrated in FIG. 7 are detected under the foregoing conditions, it is determined that the lone bit duration is longer than 1 UI. Such determination whether or not the lone bit duration is longer than 1 UI can be made based on whether or not the following conditions are satisfied: the condition where both of the first phase comparison signal LAG(n) and the second phase comparison signal LEAD(n) are in an inactivated state in the phase comparison window (n); and the condition where at least one of the second phase comparison signal LEAD(n−1) in the phase comparison window (n−1) and the first phase comparison signal LAG(n+1) in the phase comparison window (n+1) is activated. If both of the conditions are satisfied, it is determined that the lone bit duration is longer than 1 UI, and a first adjustment signal EQADJ-DN is activated. On the other hand, if one or both of the conditions are not satisfied, it is determined that the lone bit duration is not longer than 1 UI, and the first adjustment signal EQADJ-DN is not activated.

If EQDATA (first pattern), EQDATA (second pattern), and EQDATA (third pattern) illustrated in FIG. 8 are detected, it is determined that the lone bit duration is shorter than 1 UI. Determination whether or not the lone bit duration is shorter than 1 UI is made based on whether or not the following conditions are satisfied: the condition where the first phase comparison signals LAG(n−1), LAG(n+1) and the second phase comparison signals LEAD(n−1), LEAD(n+1) in the phase comparison windows (n−1) and (n+1) are in the inactivated state; and the condition where at least one of the first phase comparison signal LAG(n) and the second phase comparison signal LEAD(n) in the phase comparison window (n) is activated. If both of the conditions are satisfied, it is determined that the lone bit duration is shorter than 1 UI, and a second adjustment signal EQADJ-UP is activated. On the other hand, if one or both of the conditions are not satisfied, it is determined that the lone bit duration is not shorter than 1 UI, the second adjustment signal EQADJ-UP is not activated.

The adaptive control filter circuit 105 is configured to output a strength adjustment signal EQADJ based on the first adjustment signal EQADJ-DN and the second adjustment signal EQADJ-UP output from the determination circuit 104. The adaptive control filter circuit 105 has three filter stages.

Figure 9:
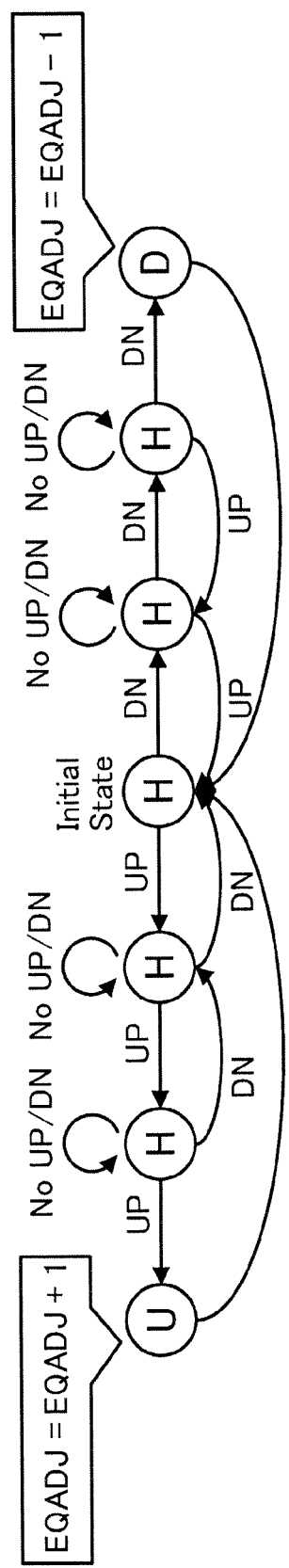
FIG. 9 is a diagram illustrating a state transition of an adaptive control filter circuit of the first embodiment of the present disclosure.

FIG. 9 illustrates a state transition of the adaptive control filter circuit 105. The state transitions to the next right state as viewed in FIG. 9 every time an activated first adjustment signal EQADJ-DN is received, and transitions to the next left state as viewed in FIG. 9 every time an activated second adjustment signal EQADJ-UP is received. When both of the first adjustment signal EQADJ-DN and the second adjustment signal EQADJ-UP are in the inactivated state, the state does not transition. If the number of receptions of activated first adjustment signals EQADJ-DN exceeds the number of receptions of activated second adjustment signals EQADJ-UP by three times, i.e., the number of filter stages (the predetermined number of times), a strength adjustment signal EQADJ is changed to the next level such that the equalization strength of the equalizer circuit 11 is decreased. On the other hand, if the number of receptions of activated second adjustment signals EQADJ-UP exceeds the number of receptions of activated first adjustment signals EQADJ-DN by three times, i.e., the number of filter stages, the strength adjustment signal EQADJ is changed to the next level such that the equalization strength of the equalizer circuit 11 is increased. After the foregoing change of the strength adjustment signal EQADJ, the state returns to an initial state. The foregoing adaptive control filter circuit 105 is mounted to further stabilize an operation upon locking. The number of filter stages of the adaptive control filter circuit 105 is not limited to three.

Right after the adaptive receiver system 10 and the adaptive transmitter system 20 are connected together, i.e., right after the adaptive receiver system 10 begins to receive a reception signal RXDATA, the equalization strength set based on the strength adjustment signal EQADJ is at an intermediate value between the highest value and the lowest value within a settable range of the equalization strength.

Figure 10:
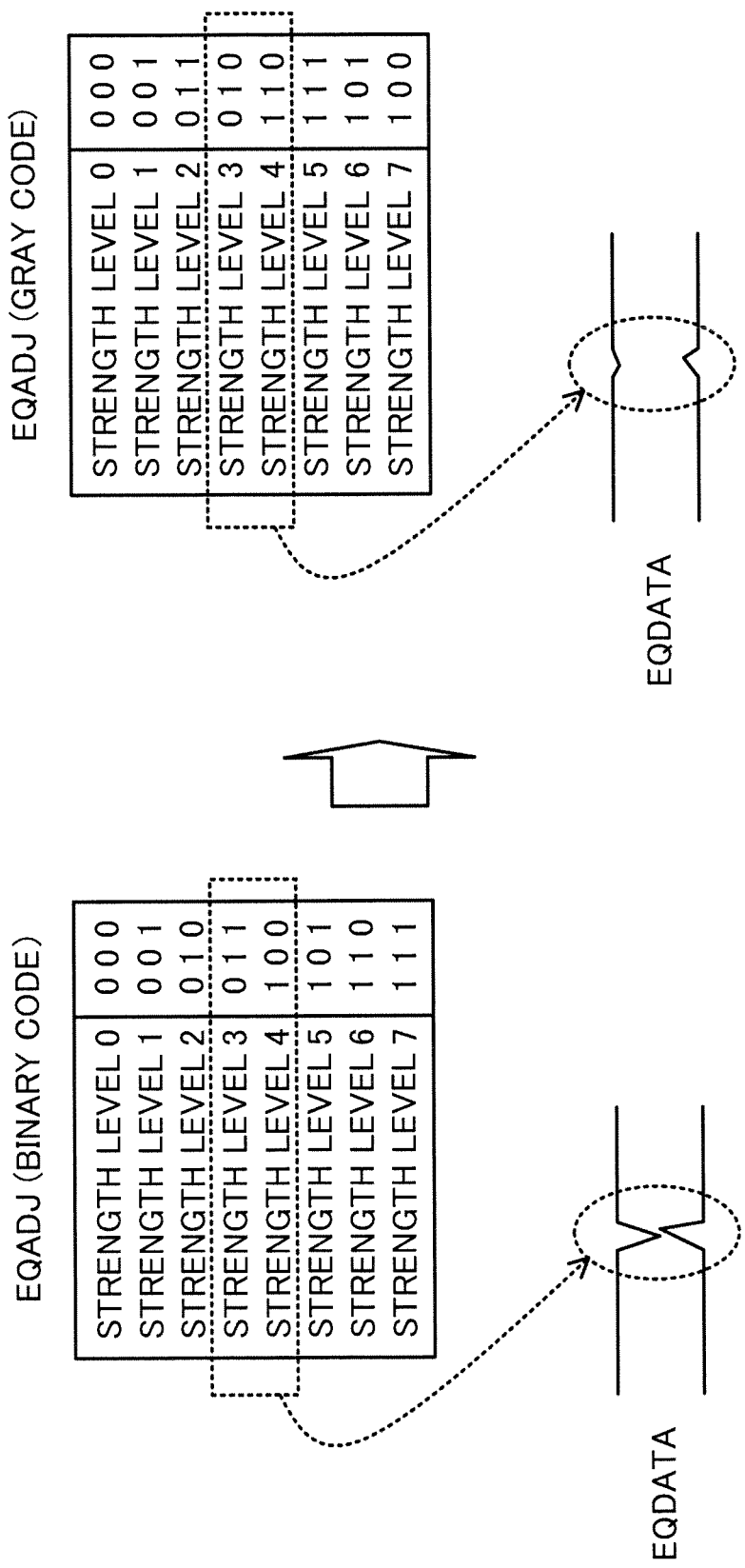
FIG. 10 is a diagram illustrating a strength adjustment signal represented by a gray code of the first embodiment of the present disclosure.

The strength adjustment signal EQADJ is represented by a gray code illustrated on the right side as viewed in FIG. 10. If the strength adjustment signal EQADJ is represented by a binary code illustrated on the left side as viewed in FIG. 10, the number of bits to be changed upon moving-up of an equalization strength level is large. For example, when the equalization strength is changed from a third strength level to a fourth strength level, the binary code is changed from "011" to "100," and therefore the total of three bits are changed. If the equalizer circuit 11 and the adaptive controller 13 are arranged physically apart from each other, a signal delay time varies due to differences in distance of a wire through which a signal having each bit is transmitted and in parasitic capacitance, and therefore a strength different from a desired strength is set for a moment. In such a case, glitch is caused in an equalization signal EQDATA, resulting in an error in a recovery signal RDOUT. However, in the first embodiment, since the strength adjustment signal EQADJ is represented by the gray code, only one of bits of a value for the strength adjustment signal EQADJ is changed when the strength level is changed to the next level. Thus, even if the bit delay of the strength adjustment signal EQADJ varies, the equalization strength is set at a pre-change or post-change strength level, and therefore glitch is less likely to occur. Although an advantage that glitch is reduced or prevented cannot be realized, the strength adjustment signal EQADJ may be represented by a code other than the gray code, such as a binary code.

<<First Variation of First Embodiment>>

In the first embodiment, a three-bit recovery signal RDOUT and three-bit phase comparison signals LAG, LEAD are used for the adaptive control (adjustment of the equalization strength) of the equalizer circuit 11. However, a recovery signal RDOUT and phase comparison signals LAG, LEAD each may have equal to or greater than four bits.

In the case where a plurality of circuits illustrated in FIG. 3A are connected together to form an equalizer circuit 11, it is often the case that a zero point is at a frequency which is different among stages of the equalizer circuit 11. An output state of equal to or greater than three consecutive bits is monitored, thereby independently adjusting an equalization strength at each stage. For example, in the case where a bit sequence ("010" or "101") including a lone bit is used to determine whether a bit duration of an equalization signal EQDATA is longer or shorter than 1 UI, the bit sequence has a highest-frequency component, and therefore the equalization strength at the stage in which the zero point is at the highest frequency is adjusted. On the other hand, in the case where a bit sequence ("0110" or "1001") having two consecutive identical bit values between inverted bit values to determine whether the bit duration of the equalization signal EQDATA is longer or shorter than 1 UI, the bit sequence has a lower-frequency component than that of a bit sequence having a lone bit, and therefore the equalization strength at the stage in which the zero point is at the second-highest frequency is adjusted. As described above, since the higher number of consecutive identical bit values between inverted bit values results in a lower-frequency component contained in a signal, the equalization strength at each stage of the equalizer circuit 11 can be independently adjusted. This adjusts equalization characteristics of the equalizer circuit 11 to a more optimal state.

<<Second Variation of First Embodiment>>

Figure 11:
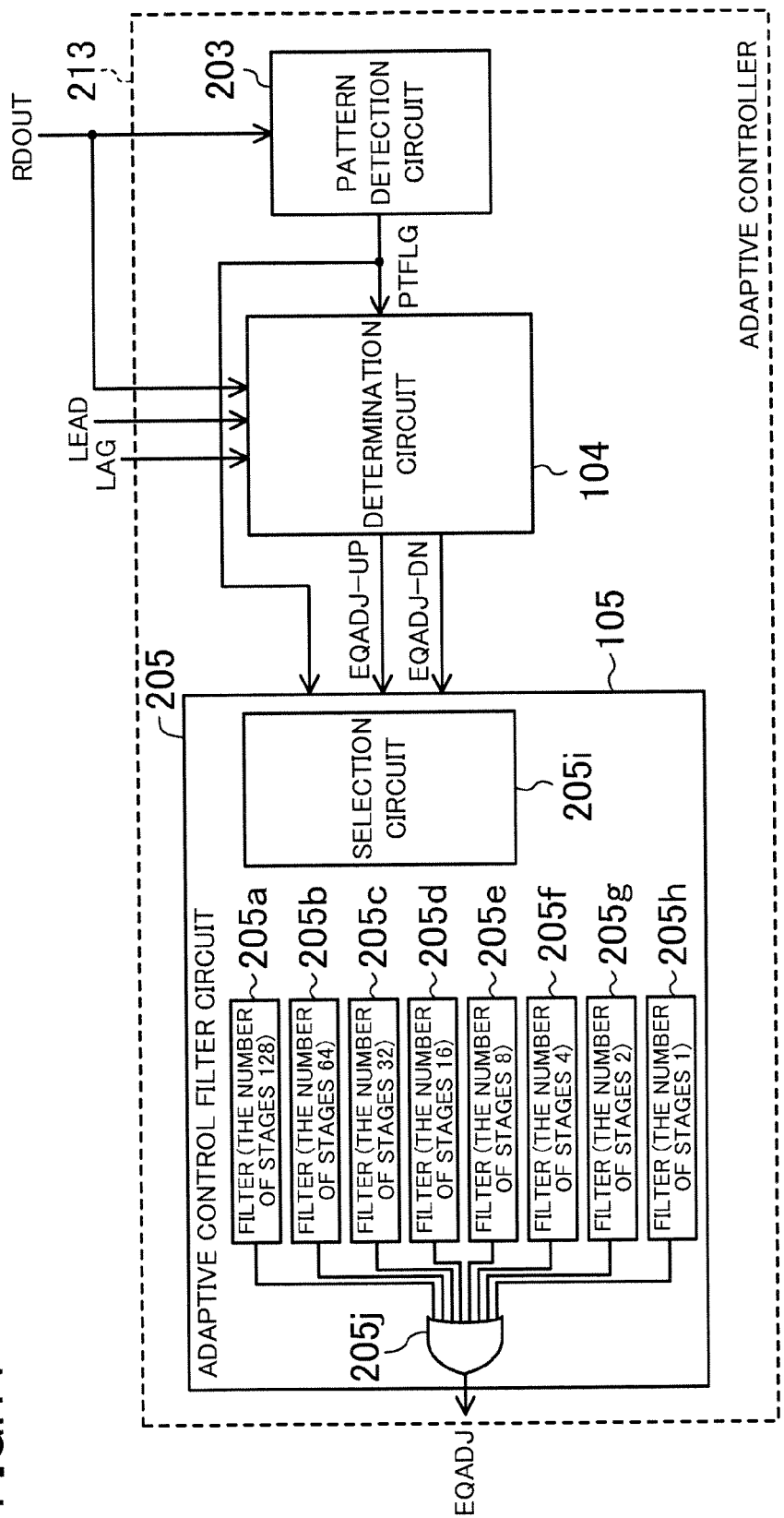
FIG. 11 is a block diagram illustrating an adaptive controller of a second variation of the first embodiment of the present disclosure.

An adaptive transceiver system 1 of a second variation of the first embodiment of the present disclosure includes an adaptive controller 213 illustrated in FIG. 11 instead of the adaptive controller 13 of the first embodiment.

The adaptive controller 213 includes a pattern detection circuit 203, a determination circuit 104, and an adaptive control filter circuit 205.

Figure 12:
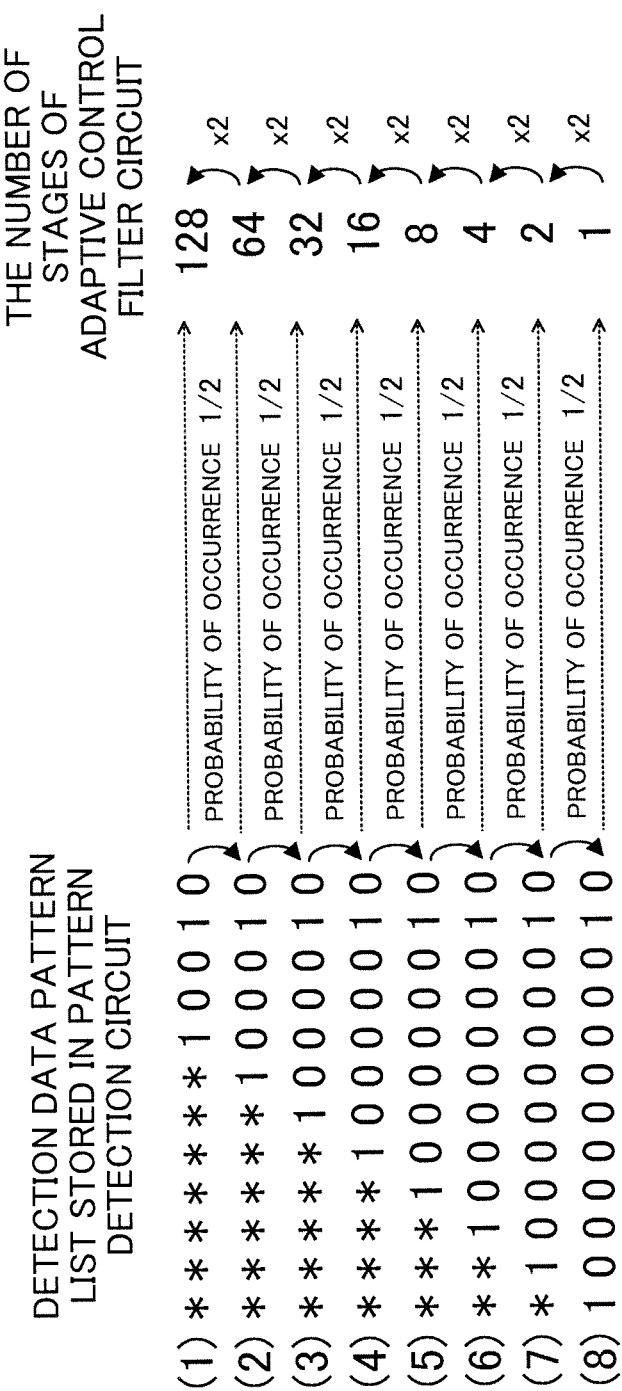
FIG. 12 is a diagram illustrating detection data sequences detected by a pattern detection circuit of the second variation of the first embodiment of the present disclosure, and the number of filter stages corresponding respectively to the detection data sequences.

The pattern detection circuit 203 is configured to detect any of data patterns (1)-(8) illustrated in FIG. 12 and output a detection flag signal PTFLG having a value corresponding to the detected data pattern. Specifically, if any of the data patterns (1)-(8) is detected, the pattern detection circuit 203 outputs such a data pattern as the detection flag signal PTFLG. If any of the data patterns (1)-(8) is not detected, the pattern detection circuit 203 outputs PTFLG=0. The adaptive control filter circuit 205 includes eight filters 205a-205h, a selection circuit 205i, and an OR circuit 205j. The filters 205a-205h are different from each other in the number of filter stages.

Based on the value for the detection flag signal PTFLG, i.e., based on whether or not any of the data patterns (1)-(8) is detected by the pattern detection circuit 203, the selection circuit 205i determines which one of the filters 205a-205h is to be used. Then, the detection flag signal PTFLG and first and second adjustment signals EQADJ-DN, EQADJ-UP are input to one of the filters 205a-205h which is determined to be used. For example, if PTFLG=1, the filter 205a having 128 filter stages is used. If PTFLG=8, the filter 205h having a single filter stage is used. Output from each of the filters 205a-205h is input to the OR circuit 205j, and a strength adjustment signal EQADJ is output from the OR circuit 205j. The types of the data pattern, the number of the data patterns, a value for the detection flag signal, and the number of filter stages are not limited to those of the foregoing example.

The magnitude of distortion caused due to ISI greatly depends, referring to FIG. 6, on a data pattern prior to a lone bit. A larger value for "k" described above results in greater distortion caused due to the ISI, and a smaller value for "k" results in less distortion caused due to the ISI. In order to minimize an influence of the ISI, it is necessary to perform waveform equalization such that a lone bit duration approaches 1 T without the dependence on the value for "k." However, a larger value for "k" results, referring to FIG. 12, in a decrease in probability of occurrence of a corresponding one of the data patterns. In the case where "0" or "1" is randomly assigned, the probability of occurrence of each data pattern is ½, and therefore such a probability is multiplied by ½ every time a value for "k" is increased by one.

In the case where the number of filter stages of the adaptive control filter circuit 105 is fixed to a certain number, first and second adjustment signals EQSET-DN, EQSET-UP are frequently activated for a data pattern whose probability of occurrence is high, and therefore the influence of the ISI is removed. Conversely, for a data pattern whose probability of occurrence is low, the influence of the ISI remains due to the low probability of occurrence of the data pattern.

Other configurations of the second variation are the same as those of the first embodiment, and therefore description thereof will not be repeated.

According to the second variation, the number of filter stages of the filter to be used varies, referring to FIG. 12, depending on the probability of occurrence of the detection data sequence. Specifically, the number of filter stages is doubled as the probability of occurrence of the detection data sequence is doubled. Thus, the frequency of activating the first and second adjustment signals EQSET-DN, EQSET-UP is maintained constant regardless of the data pattern, resulting in optimal adjustment of an equalization strength.

<<Second Embodiment>>

Figure 13:
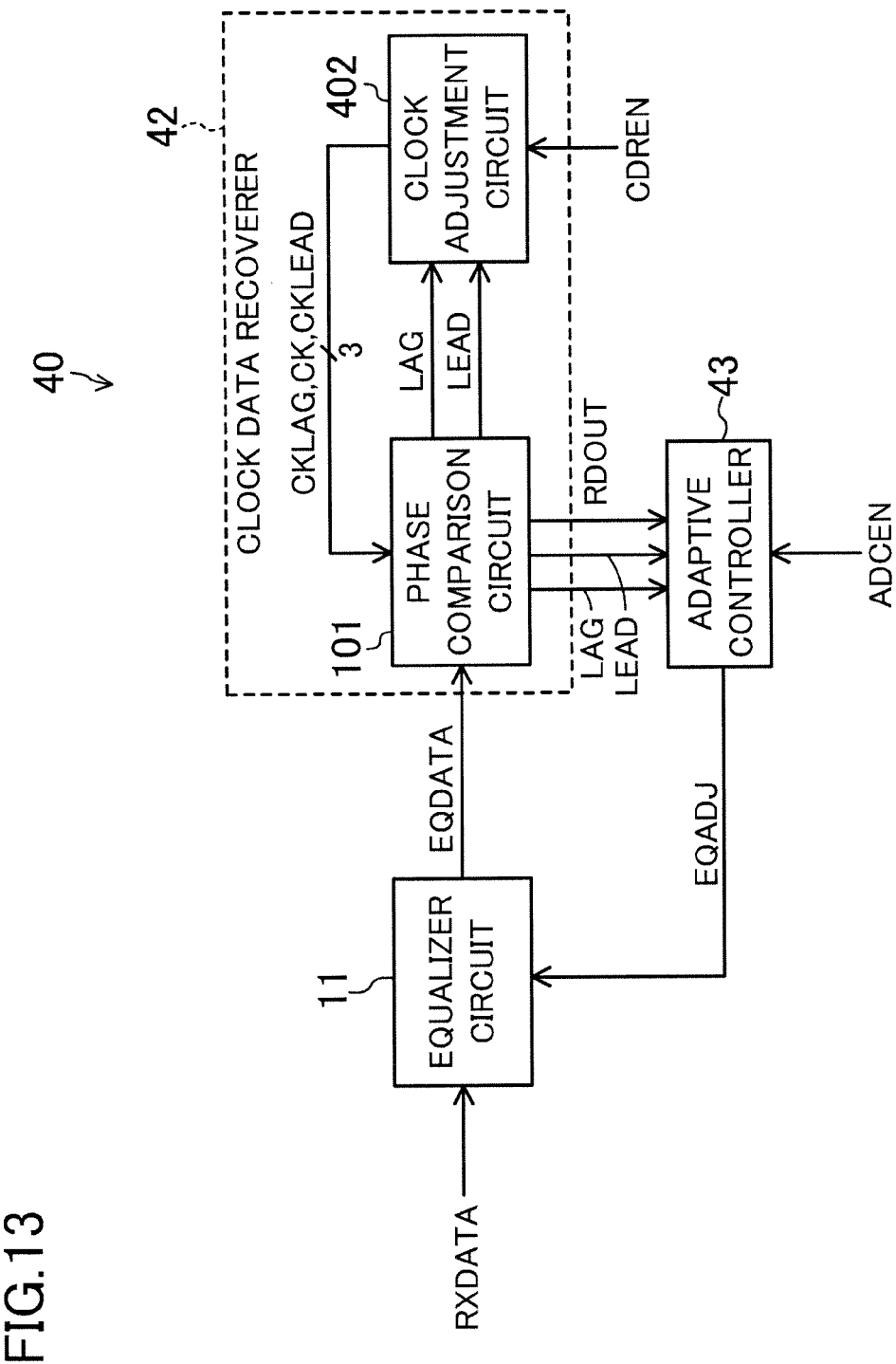
FIG. 13 is a block diagram illustrating a configuration of an adaptive receiver system of a second embodiment of the present disclosure.

An adaptive transceiver system 1 of a second embodiment of the present disclosure includes an adaptive receiver system 40 illustrated in FIG. 13 instead of the adaptive receiver system 10 of the first embodiment. The adaptive receiver system 40 includes an adaptive controller 43 instead of the adaptive controller 13, and a clock adjustment circuit 402 instead of the clock adjustment circuit 102. A phase comparison circuit 101 and the clock adjustment circuit 402 form a clock data recoverer 42.

The adaptive controller 43 has, in addition to the configuration of the adaptive controller 13 of the first embodiment, a function to lock a strength adjustment signal EQADJ in the case where an adaptive control enable signal ADCEN is in an inactivated state. In the case where the adaptive control enable signal ADCEN is in an activated state, the adaptive controller 43 can change the strength adjustment signal EQADJ, and output the strength adjustment signal EQADJ in a manner similar to that of the adaptive controller 13 of the first embodiment.

The clock adjustment circuit 402 is configured to lock the phase of each clock in the case where a clock adjustment enable signal CDREN is in the inactivated state. On the other hand, in the case where the clock adjustment enable signal CDREN is in the activated state, the clock adjustment circuit 402 can change the phases of a sampling clock CK, a first clock CKLAG, and a second clock CKLEAD, and output the sampling clock CK, the first clock CKLAG, and the second clock CKLEAD in a manner similar to that of the clock adjustment circuit 102 of the first embodiment.

If a duration of a phase comparison window is limited to a certain value, the frequency of activating phase comparison signals LAG, LEAD is decreased, and therefore it takes time to lock the phases. Referring to FIG. 14A, right after an adaptive receiver system 10 and an adaptive transmitter system 20 are connected together, i.e., right after the adaptive receiver system 10 beings to receive a reception signal RXDATA, the clock adjustment enable signal CDREN is inactivated for a predetermined period of time. During such a period, the clock adjustment circuit 402 does not adjust the phases of the sampling clock CK, the first clock CKLAG, and the second clock CKLEAD, and the clock data recoverer 42 does not perform a follow-up operation for jitter. Thus, referring to FIG. 14B, the phase comparison signals LAG, LEAD are frequently activated. Meanwhile, the adaptive control enable signal ADCEN is activated right after the reception of the reception signal RXDATA begins, and an adaptive control filter circuit 105 begins to adjust the strength adjustment signal EQADJ. Thus, the time to lock the phases can be shortened. In such a manner that the clock adjustment enable signal CDREN is activated after a lapse of a predetermined time since the adaptive receiver system 10 and the adaptive transmitter system 20 are connected together, edges of the strength adjustment signal EQADJ are put outside the phase comparison windows. Consequently, unnecessary activation of the phase comparison signals LAG, LEAD is not detected, and stability in a locking state is improved.

Other configurations of the second embodiment are the same as those of the first embodiment, and description thereof will not be repeated.

Figure 15:
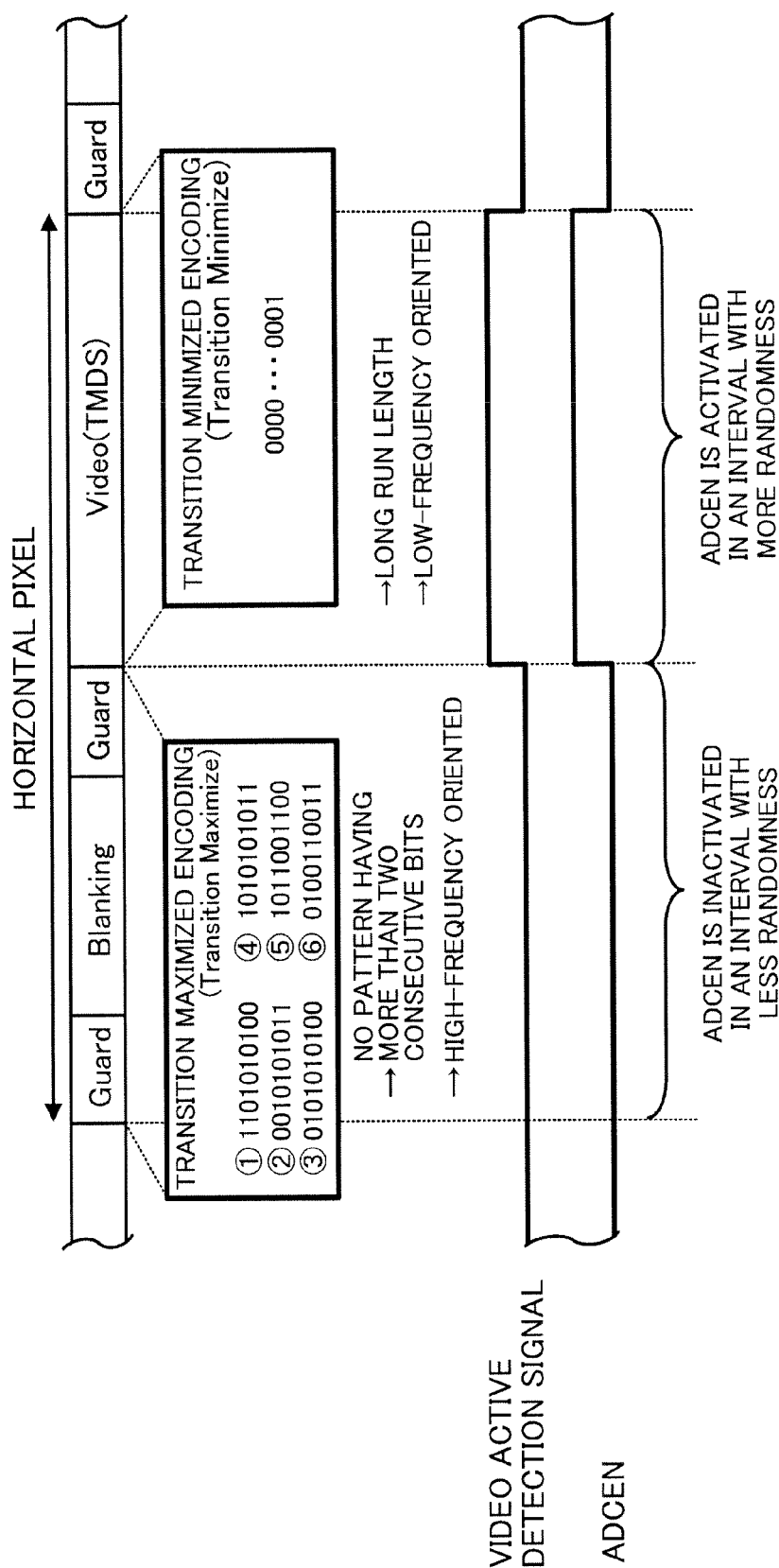
FIG. 15 is a diagram illustrating a relationship between data and an adaptive control enable signal in the case where the adaptive control enable signal is switched between an activated state and an inactivated state in synchronization with a video active detection signal in the second embodiment of the present disclosure.

Upon communication, data encoded according to an encoding method which varies depending on a data sequence may be output. For example, in the case where transmission and reception are performed by a high definition multimedia interface (HDMI), transition minimized encoding is, referring to FIG. 15, employed in a video data output interval, and therefore it is likely that identical data bits are consecutively assigned. In intervals other than the foregoing, transition maximized encoding is employed, and therefore it is less likely that identical data bits are consecutively assigned. Thus, if it is detected that a predetermined data bit periodically appears two or more predetermined times in the equalization signal EQDATA, the adaptive control enable signal ADCEN is rendered into an inactivated state. On the other hand, if it is not determined that the predetermined data bit periodically appears two or more predetermined times in the equalization signal EQDATA, the adaptive control enable signal ADCEN is rendered into the activated state. In such a manner, an adaptive operation can be enabled only if the equalization signal EQDATA is data having great distortion caused due to ISI. Suppose that the number of the foregoing predetermined times is set at, e.g., three. In the case where it is detected that a predetermined data bit periodically appears three times in the equalization signal EQDATA, the adaptive control enable signal ADCEN is rendered into the inactivated state. On the other hand, in the case where it is not detected that the predetermined data bit periodically appears three times in the equalization signal EQDATA, the adaptive control enable signal ADCEN is rendered into the activated state. This reduces or prevents a false lock caused due to an imbalance in data patterns.

<<Third Embodiment>>

Figure 16:
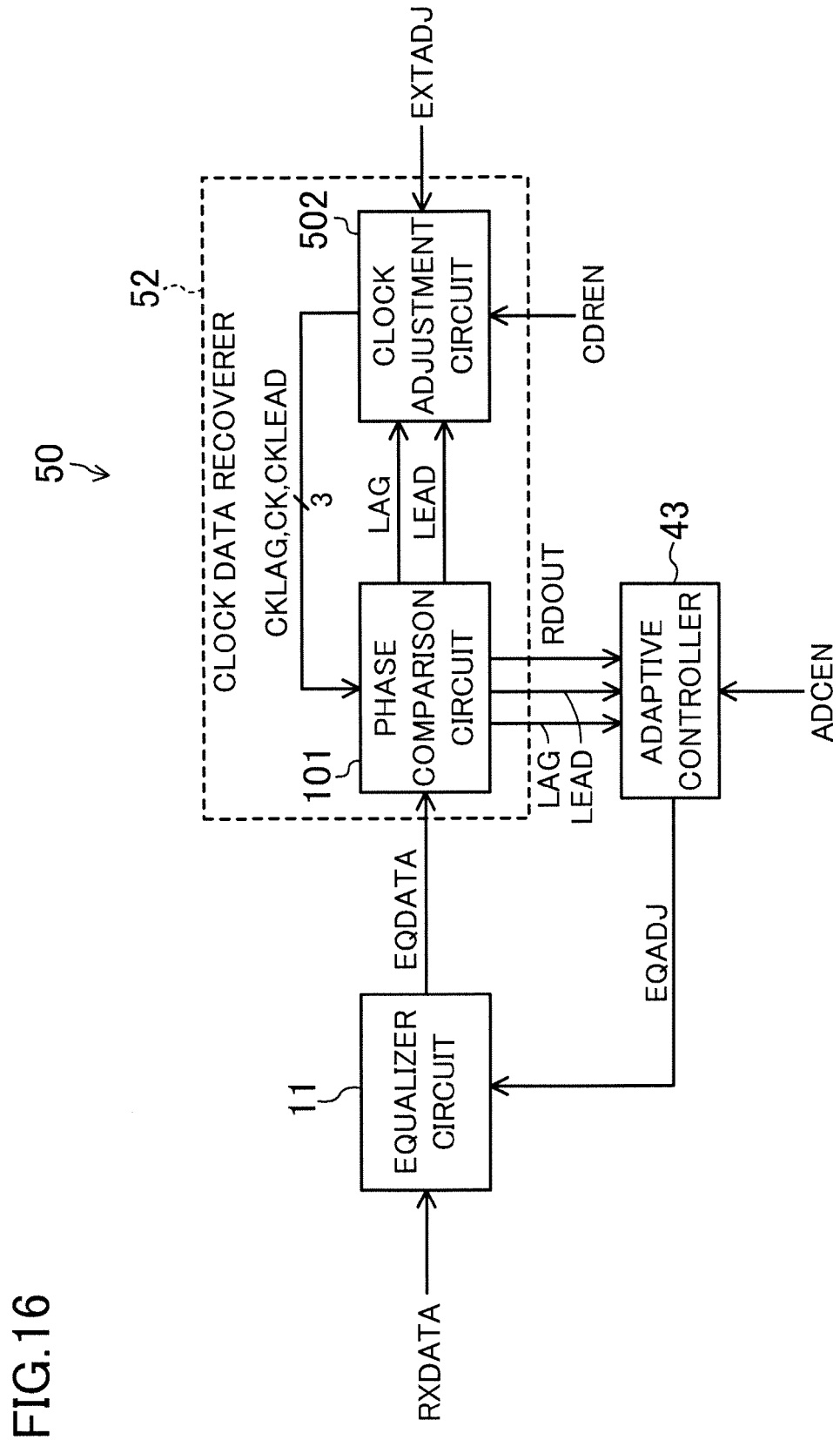
FIG. 16 is a block diagram illustrating a configuration of an adaptive receiver system of a third embodiment of the present disclosure.

An adaptive transceiver system 1 of a third embodiment of the present disclosure includes an adaptive receiver system 50 illustrated in FIG. 16 instead of the adaptive receiver system 40 of the second embodiment. The adaptive receiver system 50 includes a clock adjustment circuit 502 instead of the clock adjustment circuit 402. A phase comparison circuit 101 and the clock adjustment circuit 502 form a clock data recoverer 52.

The clock adjustment circuit 502 can forcibly change the phases of a sampling clock CK, a first clock CKLAG, and a second clock CKLEAD depending on an activation state of an external phase adjustment signal EXTADJ.

Figure 17A:
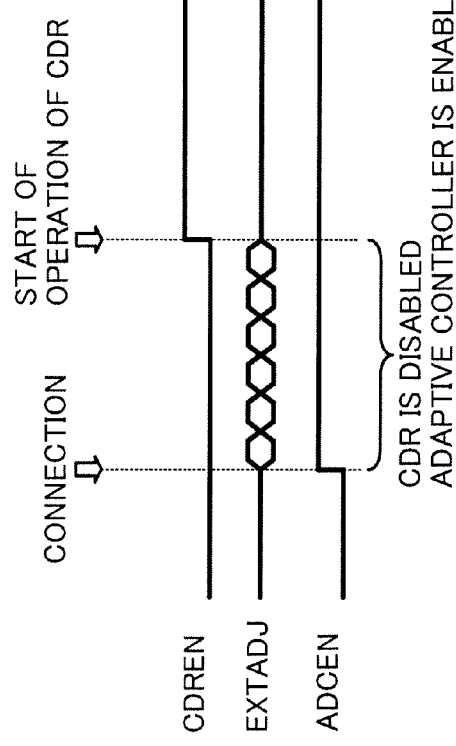
FIG. 17A is a timing chart illustrating waveforms of a clock adjustment enable signal, an external phase adjustment signal, and an adaptive control enable signal right after a connection between the adaptive receiver system and an adaptive transmitter system in the third embodiment of the present disclosure.
Figure 17B:
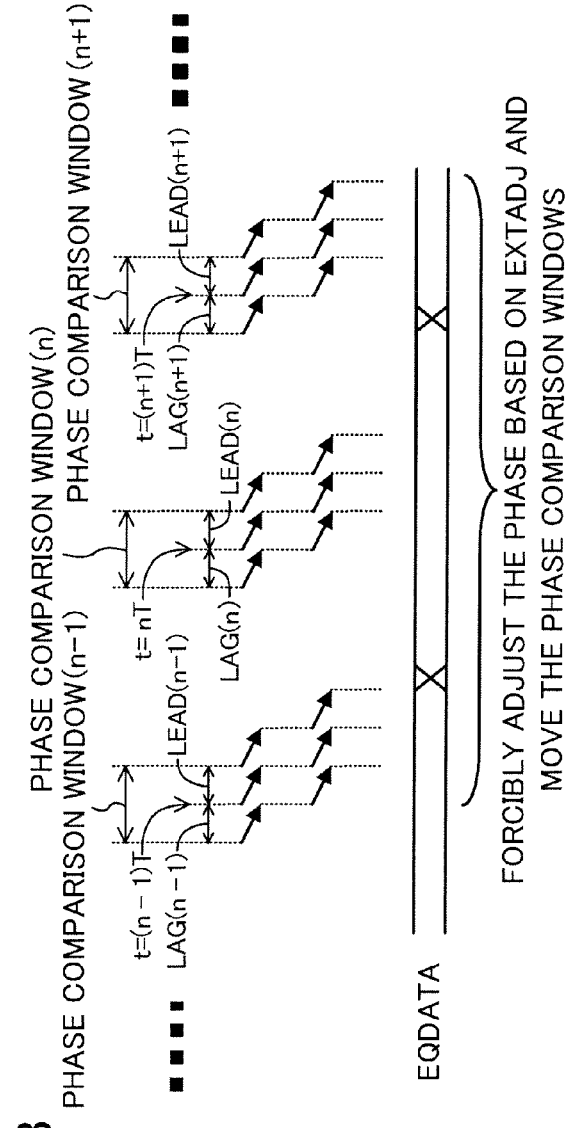
FIG. 17B is a diagram illustrating a relationship between an equalization signal and a phase comparison window in the third embodiment of the present disclosure.

If a duration of a phase comparison window is limited to a certain value, the frequency of activating first and second phase comparison signals LAG(n), LEAD(n) is decreased, and therefore it takes time to lock the phases. Referring to FIG. 17A, for a predetermined period of time right after an adaptive receiver system 10 and an adaptive transmitter system 20 are connected together, i.e., right after the adaptive receiver system 10 beings to receive a reception signal RXDATA, the activation state of the external phase adjustment signal EXTADJ is changed once a predetermined time period with an clock adjustment enable signal CDREN being inactivated. Then, the clock adjustment circuit 502 adjusts, for the predetermined period of time, the phases of the sampling clock CK, the first clock CKLAG, and the second clock CKLEAD based on the external phase adjustment signal EXTADJ. Referring to FIG. 17B, the phase comparison windows are moved, and phase comparison signals LAG, LEAD are frequently activated even if there is small jitter in data or a clock. At this point, an adaptive control enable signal ADCEN is activated right after the reception of the reception signal RXDATA begins, and an adaptive control filter circuit 105 begins to adjust a strength adjustment signal EQADJ. Thus, the time to lock the phases can be further shortened. As in the second embodiment, in such a manner that the clock adjustment enable signal CDREN is activated after a lapse of a predetermined time since the adaptive receiver system 10 and the adaptive transmitter system 20 are connected together while the external phase adjustment signal EXTADJ is inactivated, stability in a locking state is improved.

Other embodiments of the third embodiment are the same as those of the second embodiment, and description thereof will not be repeated.

The adaptive receiver system and the adaptive transceiver system of the present disclosure are useful for, e.g., an ultrafast transmission system whose speed exceeds 1 Gb/s.

What is claimed is:

1. An adaptive receiver system for receiving a reception signal, comprising:
    an equalizer circuit configured to equalize the reception signal based on a strength adjustment signal representing an equalization strength and output the reception signal after equalization as an equalization signal;

a phase comparison circuit including
- a first phase comparator to which a sampling clock and a first clock having a first predetermined phase advance with respect to the sampling clock and which outputs a first phase comparison signal indicating whether or not an edge of the equalization signal is in a first interval between sampling timing of the sampling clock and sampling timing of the first clock, and
- a second phase comparator to which the sampling clock and a second clock having a second predetermined phase delay with respect to the sampling clock and which outputs a second phase comparison signal indicating whether or not the edge of the equalization signal is in a second interval between the sampling timing of the sampling clock and sampling timing of the second clock;

a clock adjustment circuit configured to adjust, based on the first and second phase comparison signals, a phase of the sampling clock such that a phase of the equalization signal and the phase of the sampling clock are coincidence with each other and output the sampling clock;

a recoverer configured to output a recovery signal obtained by sampling the equalization signal by using the sampling clock;

a pattern detection circuit configured to detect a detection data pattern based on the recovery signal;

a determination circuit to which an output signal of the pattern detection circuit is input and which is configured to compare, when the detection data pattern is detected, output patterns of the first and second phase comparison signals with a predetermined comparison target pattern and determine a bit duration of the equalization signal based on whether or not the output patterns and the predetermined comparison target pattern are matched to each other; and an adaptive control filter circuit configured to adjust the strength adjustment signal based on a determination result of the determination circuit.

2. The adaptive receiver system of claim 1, wherein a length of each of the first and second intervals is equal to or shorter than ⅓ UI.

3. The adaptive receiver system of claim 1, wherein the detection data pattern detected by the pattern detection circuit includes three consecutive bits where a value for an intermediate bit is different from values for bits sandwiching the intermediate bit.

4. The adaptive receiver system of claim 3, wherein in the detection data pattern detected by the pattern detection circuit, two or more consecutive bits having an identical value come before the intermediate bit.

5. The adaptive receiver system of claim 3, wherein the predetermined comparison target pattern means that the second phase comparison signal corresponding to a bit right before the intermediate bit indicates a presence of the edge of the equalization signal, and the first and second phase comparison signals corresponding to the intermediate bit indicate an absence of the edge of the equalization signal, and if the output patterns and the predetermined comparison target pattern are matched to each other, the determination circuit determines that the bit duration of the equalization signal is longer than 1 UI.

6. The adaptive receiver system of claim 3, wherein the predetermined comparison target pattern means that the first phase comparison signal corresponding to a bit right before the intermediate bit indicates a presence of the edge of the equalization signal, and the first and second phase comparison signals corresponding to the intermediate bit indicates an absence of the edge of the equalization signal, and if the output patterns and the predetermined comparison target pattern are matched to each other, the determination circuit determines that the bit duration of the equalization signal is longer than 1 UI.

7. The adaptive receiver system of claim 3, wherein the predetermined comparison target pattern means that one of the first or second phase comparison signals corresponding to the intermediate bit indicates a presence of the edge of the equalization signal, and both of the first and second phase comparison signals corresponding to bits right before and right after the intermediate bit indicate an absence of the edge of the equalization signal, and if the output patterns and the predetermined comparison target pattern are matched to each other, the determination circuit determines that the bit duration of the equalization signal is shorter than 1 UI.

8. The adaptive receiver system of claim 3, wherein the predetermined comparison target pattern means that both of the first and second phase comparison signals corresponding to the intermediate bit indicate a presence of the edge of the equalization signal, and both of the first and second phase comparison signals corresponding to bits right before and right after the intermediate bit indicate an absence of the edge of the equalization signal, and if the output patterns and the predetermined comparison target pattern are matched to each other, the determination circuit determines that the bit duration of the equalization signal is shorter than 1 UI.

9. The adaptive receiver system of claim 3, wherein when a number of determinations made by the determination circuit and indicating that the bit duration of the equalization signal is longer than 1 UI exceeds, by a predetermined number of times, a number of determinations made by the determination circuit and indicating that the bit duration of the equalization signal is shorter than 1 UI, the adaptive control filter circuit changes the strength adjustment signal such that the equalization strength is decreased, and when the number of determinations made by the determination circuit and indicating that the bit duration of the equalization signal is shorter than 1 UI exceeds, by the predetermined number of times, the number of determinations made by the determination circuit and indicating that the bit duration of the equalization signal is longer than 1 UI, the adaptive control filter circuit changes the strength adjustment signal such that the equalization strength is increased.

10. The adaptive receiver system of claim 9, wherein the pattern detection circuit detects plural types of detection data patterns, and the adaptive control filter circuit includes a selection circuit determining the predetermined number of times based on which one of the plural types of detection data patterns is detected by the pattern detection circuit.

11. The adaptive receiver system of claim 1, wherein no adjustment of the phase of the sampling clock by the clock adjustment circuit is performed for a predetermined period of time right after reception of the reception signal begins, and adjustment of the strength adjustment signal by the adaptive control filter circuit begins right after the reception of the reception signal begins.

12. The adaptive receiver system of claim 1, wherein
adjustment of the phase of the sampling clock by the clock adjustment circuit is performed based on an external phase adjustment signal for a predetermined period of time right after reception of the reception signal begins, and adjustment of the strength adjustment signal by the adaptive control filter circuit begins right after the reception of the reception signal begins.

13. The adaptive receiver system of claim 1, wherein
the strength adjustment signal represents a strength level by using a gray code.

14. The adaptive receiver system of claim 1, wherein
right after reception of the reception signal begins, the equalization strength set based on the strength adjustment signal is at an intermediate value between a highest value and a lowest value within a settable range of the equalization strength.

15. The adaptive receiver system of claim 1, further comprising:
a detector configured to
stop the adaptive control filter circuit from adjusting the strength adjustment signal when it is detected that a predetermined data sequence periodically appears two or more predetermined times in the equalization signal, and
cause the adaptive control filter circuit to adjust the strength adjustment signal when it is not determined that the predetermined data sequence periodically appears two or more predetermined times in the equalization signal.

16. An adaptive transceiver system, comprising:
the adaptive receiver system of claim 1; and
an adaptive transmitter system configured to output the reception signal.

17. The adaptive receiver system of claim 1, wherein
the phase comparison circuit is set such that no edge of the equalization signal is in the first and second intervals in a state in which the phases of the equalization signal and the sampling clock are coincidence with each other.

18. The adaptive receiver system of claim 1, wherein
the pattern detection circuit detects, as the detection data pattern, a data pattern having three or more consecutive bits and including at least two bit inverts.

19. The adaptive receiver system of claim 1, wherein
the determination circuit compares the predetermined comparison target pattern with output patterns of the first and second phase comparison signals corresponding to each bit of the detection data pattern detected by the pattern detection circuit.

* * * * *